(12) United States Patent
Böhm et al.

(10) Patent No.: US 6,318,797 B1
(45) Date of Patent: Nov. 20, 2001

(54) MOTOR VEHICLE ROOF MODULE

(75) Inventors: Horst Böhm, Frankfurt; Thomas Becher, Rodgau; Rainer Grimm, Frankfurt, all of (DE)

(73) Assignee: Meritor Automotive GmbH (DE)

( * ) Notice: Subject to any disclaimer, the term of this patent is extended or adjusted under 35 U.S.C. 154(b) by 0 days.

(21) Appl. No.: 09/695,738

(22) Filed: Oct. 24, 2000

(30) Foreign Application Priority Data

Oct. 26, 1999 (DE) .............................................. 199 51 659

(51) Int. Cl.[7] ...................................................... B60J 7/00
(52) U.S. Cl. ........................ 296/210; 296/214; 296/39.1; 296/208
(58) Field of Search ................................. 296/210, 214, 296/39.1, 208

(56) References Cited

U.S. PATENT DOCUMENTS

| | | | |
|---|---|---|---|
| 4,119,749 | * 10/1978 | Roth et al. | 296/210 |
| 4,119,794 | * 10/1978 | Matsuki | 296/214 |
| 4,131,702 | * 12/1978 | Alfter et al. | 296/214 |
| 4,741,945 | * 5/1988 | Brant et al. | 296/214 |
| 4,902,068 | * 2/1990 | Dowd et al. | 296/214 |
| 5,357,408 | * 10/1994 | Lecznar et al. | 296/214 |
| 5,484,186 | * 1/1996 | Van Order et al. | 296/214 |
| 5,599,086 | * 2/1997 | Dutta | 296/214 |
| 5,688,022 | * 11/1997 | Adams et al. | 296/214 |
| 5,699,438 | * 12/1997 | Smith et al. | 381/188 |
| 5,754,664 | * 5/1998 | Clark et al. | 296/214 |
| 5,845,458 | * 12/1998 | Patel | 296/210 |
| 6,086,145 | * 7/2000 | Wandyez | 296/214 |

FOREIGN PATENT DOCUMENTS

| | | | |
|---|---|---|---|
| 19709016 | 10/1998 | (DE) . | |
| 2929689 | * 2/1981 | (DE) | 296/210 |
| 3923122 | * 3/2000 | (DE) | 296/214 |
| 0346154 | * 12/1989 | (EP) | 296/214 |

* cited by examiner

Primary Examiner—Joseph D. Pape
Assistant Examiner—Kiran B. Patel
(74) Attorney, Agent, or Firm—Carlson, Gaskey & Olds

(57) ABSTRACT

For a motor vehicle roof module, preferably of sandwich construction comprising a rigid roof skin and an inner shell of PUR plastic applied as a foam to its inner surface, it is proposed to form recesses in the single layer area of the inner shell when applying the foam, in which functional components, such as loudspeakers, can be placed without a housing and can be secured by catches.

18 Claims, 2 Drawing Sheets

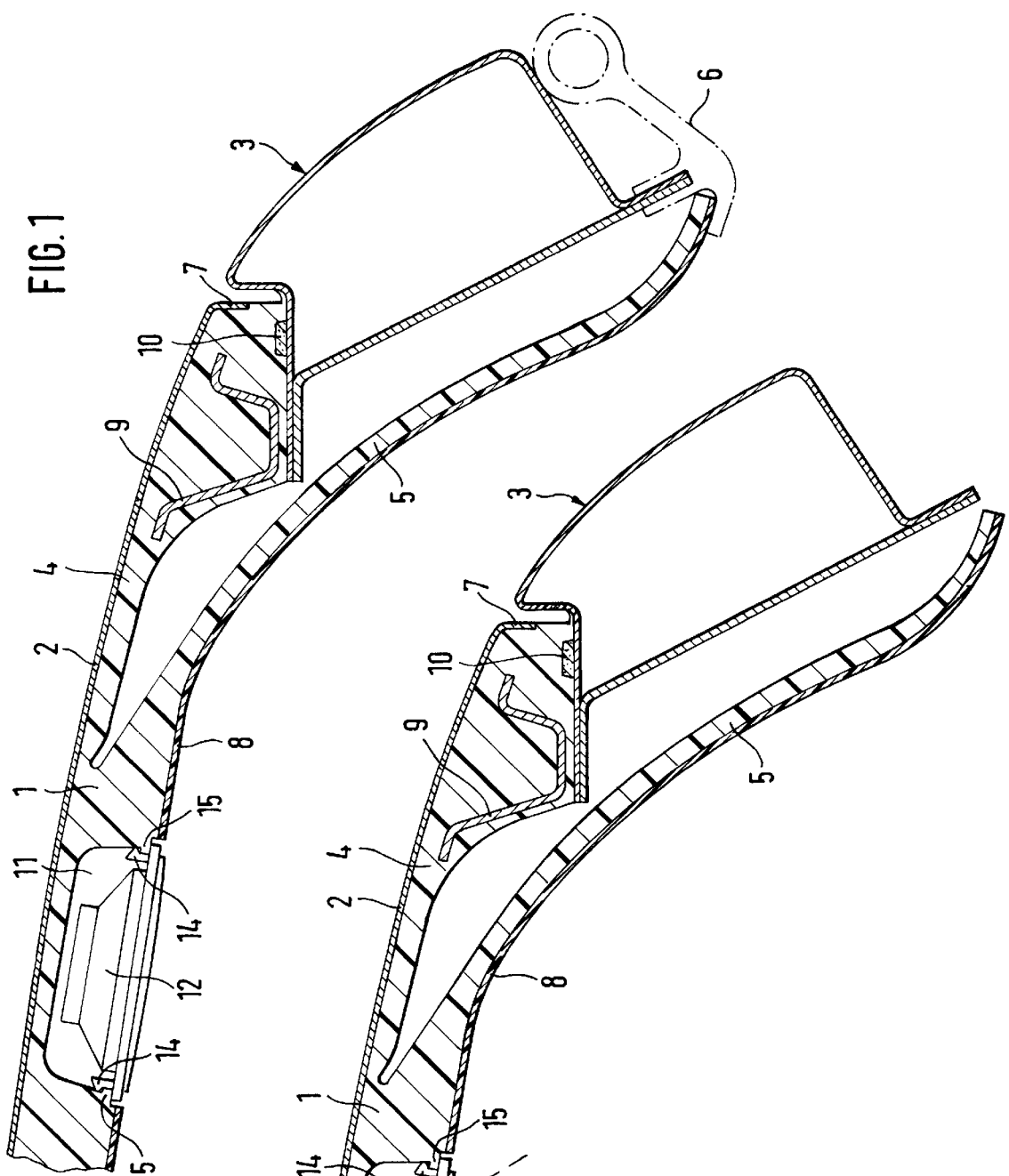

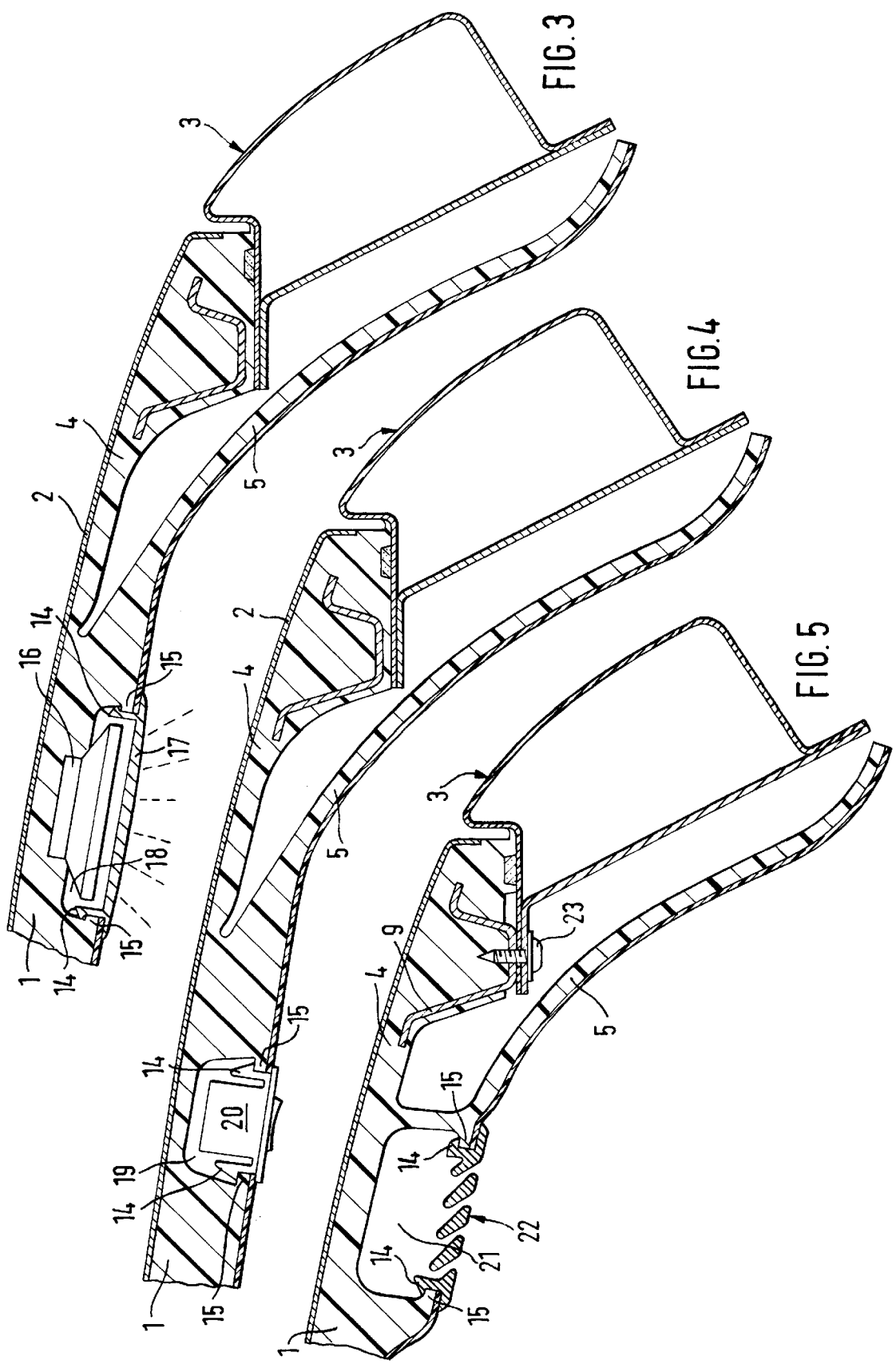

MOTOR VEHICLE ROOF MODULE

BACKGROUND OF THE INVENTION

The invention relates to a motor vehicle roof.

Modular, ready to install, pre-fabricated vehicle roofs of this kind are manufactured separately from the vehicle body and are only united with the vehicle body on the assembly line at the motor vehicle manufacturer's factory. Such vehicle roof modules are gaining in importance, especially owing to the considerably reduced assembly-line.

For a known vehicle roof (DE 197 09 016 A1), the areas of the inner shell which can be bent downwards are provided at the places suitable for the purpose with at least one pre-assembled element from the group consisting of sunblinds, handles, ventilation grilles, interior lights, shock absorbing safety elements, airbags etc. or with prepared places for attaching at least one of these elements. In so far as, due to their functions, these elements are to be fitted in the area of the outer edges of the inner shell and/or are to be secured on the body frame, as is the case for sunblinds and handles for example, these places for attachment already exist on the inner shell. Pre-assembly of the elements can be made more difficult due to the easily bendable and initially rather unstable bottom layer and/or due to the weight and the dimensions of the elements.

This invention is based on the problems of facilitating this pre-assembly while at least largely retaining pre-assembly of all the functional elements on the vehicle roof module.

SUMMARY OF THE INVENTION

According to the present invention, there is provided a vehicle roof module of sandwich construction, having an inner shell molded of plastic foam, which forms a roof liner, manufactured separately from the vehicle body, which can be supported on a body frame by its outer edges and can be securely connected to this, the inner shell being divided into two layers in an area defining outer edges intended for placement on the body frame, there being a top layer that can be laid on the body frame and there being a bottom layer that can be bent downwards and is designed as a cladding for the body frame; wherein pre-assembled functional elements are also attached on the inner shell at suitable locations and wherein the roof module has an area of the inner shell which is not divided into two layers in which recesses are formed emerging from the roof liner into which functional elements can be placed so as to be detachable.

According to the basic idea of the invention, the inner shell is incorporated in the pre-assembly of functional elements in its fixed area which is not divided into two layers. At the same time, during the process of applying the foam which forms the inner shell, recesses are formed which are open downwards (in relation to the built-in roof module), the dimensions of which are adapted to the functional element to be mounted. In this way certain functional elements such as lamps, switches etc. can be attached in user friendly fashion to all points of the fixed inner shell. Even functional elements which in themselves are heavy, such as loudspeakers, can be pre-assembled in this way.

Incorporation of the fixed area of the inner shell as a place for attaching the pre-assembled functional elements is particularly beneficial for pre-assembled functional elements which are normally provided with a protective housing or cover on their rear side facing away from the visible and/or the operating side. Functional elements of this kind can be manufactured without a housing and/or can be placed in the shaped recesses without a housing, because the recesses themselves form the housing after assembly. Not only is assembly facilitated in this way, but weight can also be saved.

If the functional element to be pre-assembled is a lamp, a part of the lamp which basically consists of a reflector and lamp holder can be molded securely into the foam plastic of the fixed inner part of the vehicle roof when the foam is applied, while only a transparent cover panel need be placed in the molded-in recess as a separate part, and therefore forms the only detachable functional element installed.

To facilitate assembly, it is an advantage if the functional elements are provided with catches, which can engage in and are detachable from the opposing elements which are molded in or on the shaped recesses preferably when the inner shell is formed. Secure engagement is easily achieved if the catches are formed as hooks, while the opposing elements are step-type projections or similar on the inner shell formed during foam molding of the shell.

BRIEF DESCRIPTION OF THE DRAWINGS

For a better understanding of the invention and to show how the same may be carried into effect, reference will now be made, by way of example, to the accompanying drawings, in which all the figures show detached cross-section views through one of the two side areas of a roof module, supported on a body frame and secured to it. In detail, the figures are as follows:

FIG. 1 shows a cross section through a roof module with a pre-assembled loudspeaker;

FIG. 2 shows a cross section through a roof module with a pre-assembled lamp unit;

FIG. 3 shows a cross section through a roof module with a lamp component molded in the foam and a separate cover panel;

FIG. 4 shows a cross section through a roof module with a pre-assembled electrical switch; and FIG. 5 shows a cross section through a roof module with a pre-assembled ventilation grille.

DETAILED DESCRIPTION OF THE PREFERRED EMBODIMENTS

In all the practical examples shown, the inner shell 1 of the roof module is formed from a plastic foam applied to a rigid roof skin 2. The rigid roof skin 2 consists of a metal panel, for example aluminium panel, or can be formed from a vacuum molded plastic sheet. The invention, however, can also be applied to roof module embodiments where no rigid roof skin is provided. Here the roof module basically consists of a hard shell-shaped and self-supporting plastic foam molding with a gloss painted outer surface.

In all the practical examples the inner shell 1 is divided into two layers in the area of the outer edges intended for placement on the body frame 3, of which the top layer 4 is laid on the body frame 3, while the bottom layer 5 projects over the outer edges of the vehicle roof and can be bent over downwards without permanent deformations for penetration through the body opening bounded by the body frame 3. The bottom layer 5 is designed for application and securing to the body frame 3, for example via functional elements (not shown) which are to be screwed on to the body frame. The connection between the bottom layer 5 and the body frame 3 can be made by a connecting piece 6, which is only shown schematically in FIG. 1 by broken lines, which can also have a hollow chamber section for sealing the neighbouring vehicle door (not shown) in relation to the body frame 3.

Suitable materials for the inner shell 1 are hard foam PUR based plastics, which can be reinforced by fiber materials incorporated into the plastic before the foam is applied, for example glass fiber sections. However, textile, knitted and fleece fabrics etc. incorporated into the molded foam are also suitable as reinforcement. From the foam application of the reinforced inner shell 1, the top layer 4 of which extends to an edge 7 of the roof skin 2, a composite sandwich type roof module of high dimensional stability and strength is created. All the interior contours of the inner shell 1, including the bottom layer 5, are formed by appropriate shaping of the foam mould (not shown).

The inner surface of the inner shell 1 can be covered to form a vehicle roof liner using either a fabric or film-like covering material 8. In the top layer 5 can be embedded a reinforcing component 9 in the form of a section passing through in the foam. This reinforcing component 9 can serve to secure the roof module to the body frame 3 (not shown). Moreover, in all the practical examples illustrated, the top layer 4, which is thicker in the area of support on the body frame 3, is provided with a retaining groove formed all around it, in which an adhesive beading 10 is placed, sealing and fastening the roof module to the body frame 3.

In the practical examples shown in FIGS. 1 and 2 the inner shell 1 is provided in its solid area, i. e., where it is not divided into two layers 4 and 5, with a recess 11 extending from the roof interior surface, in which, in the case shown in FIG. 1, a loudspeaker 12 is housed and, in FIG. 2, a complete lamp unit 13. The loudspeaker 12 and the lamp unit 13 are each provided with a number of catches 14 evenly distributed around their periphery, these being pliant, i.e., springy, and hook shape.

At least at the locations of the catches 14, the recesses 11 are each provided with step projections 15 molded on or in them, behind which the catches 14 engage when the loudspeaker 12 and the lamp unit 13 are pushed in, until their peripheral edges come to rest against an annular surface arranged as an end stop for them in the inner shell 1. In this way, secure holding of the functional element concerned to the inner shell 1 is achieved. Of course, the arrangement is such that the lower visible surfaces of the functional elements concerned do not project or only project insignificantly from the interior surface of the roof. The step projections 15 can also be components of a ring collar which projects inwards from the peripheral wall of the recess 11. At the locations of the functional elements described the cover material 8 in the embodiments shown in FIGS. 1 and 2 has a corresponding cut-out. The electrical cables (not shown) to which the loudspeaker 12 and the lamp unit 13 are connected can be included in the foam molding at the same time as the inner shell and end in the recess 11.

In the practical example shown in FIG. 3, a lamp unit is formed in two parts, i.e., consists on the one hand of a top part 16 mainly comprising the reflector and the lamp holder and, on the other, of a transparent cover plate 17. While the top part 16 is at least partially molded in when the foam for the inner shell 1 is applied, as is apparent from FIG. 3, the transparent cover plate 17 is provided with catches 14 in the way already described with reference to FIGS. 1 and 2, which can interlock with step projections 15 on the periphery of the recess 18.

In the practical example shown in FIG. 4 a switch 20 is set in the recess 19, the dimensions of which are arranged to suit, and, in the way already described, is interlocked with the step projections 15 by means of catches 14. As already described with reference to the embodiments of FIGS. 1 and 2, in the embodiments shown in FIGS. 3 and 4 electrical cables are also embedded in the foam of the inner shell 1 when the foam is applied and end in the recesses 18 and 19.

In the practical example shown in FIG. 5, the recess 21 is part of an air conduit system (not shown), through which fresh air or air from the air conditioning system can be supplied to the interior of the motor vehicle. It is also possible to extract outgoing air from the interior of the motor vehicle in this way. The recess 21 and the conduit system belonging to it are molded into the inner shell 1 when it is molded from the foam. The circular or longitudinal bottom opening of the recess 21 is closed by a ventilation grille 22, which can be provided with catches 14, enabling the ventilation grille 22 to be placed on or in the recess 21 by interlocking with the step projections 15 in the manner already described. Moreover, the roof module shown in the design example in FIG. 5 can be formed in the way described in relation to FIGS. 1 and 4. In the example in the drawing, however, the reinforcing component 9 is not completely embedded in the thickened area of the top layer 4, but lies with its bottom surface exposed, so that the reinforcing component 9 is in direct contact with the body frame 3. The roof modules shown in FIGS. 1 to 4 can, of course, also be formed accordingly. The example shown in FIG. 5 demonstrates how the roof module can be connected to the body frame 3 by screws 23.

The practical examples described and shown in the drawings demonstrate that it is possible to place functional elements in appropriately shaped recesses, in particular those which generally have a housing, but which are designed to be installed without a housing. Here the recesses molded into the plastic foam enclose the rear parts of the functional elements like a housing.

For a motor vehicle roof module, preferably of sandwich construction from a rigid roof skin and an inner shell made of PUR plastic applied as a foam to its inner surface, it is proposed to form recesses in the single layer area of the inner shell when applying the foam, into which functional components, such as loudspeakers, are inserted without a housing and can be secured therein by catches.

It will be understood that the invention is capable of modification and therefore is not to be limited to the precise details set forth. Rather, various modifications may be made in the details within the scope and range of equivalents of the claims without departing from the spirit of the invention.

What is claimed is:

1. A vehicle roof module assembly that is manufactured separately from another portion of the vehicle body, comprising:

a shell having an inner surface that is adapted to face toward an interior of a vehicle and an outer surface that provides a roof surface for the vehicle, the shell having at least two side edges and a central portion extending between the side edges, the central portion including at least one recess in the shell between the inner surface and the outer surface with an opening facing in the same direction as the inner surface such that a vehicle component can be selectively placed at least partially into the recess and the shell supports the vehicle component in the recess.

2. The assembly of claim 1, including a vehicle component received within the recess and wherein the vehicle component is one of a light, a speaker, a switch, or a ventilation grill.

3. The assembly of claim 1, including a component supported within the recess and wherein the recess has an end wall and at least one side wall that comprise the same material as the shell, the end wall and side wall cooperating to form a housing that encloses portions of the component positioned within the recess.

4. The assembly of claim 1, wherein the recess includes at least one side wall extending from the inner surface toward an interior of the recess, the side wall establishing a first inside dimension of the recess, including mounting elements formed on the side wall near an open end of the recess, the mounting elements protruding from the side wall such that at least a portion of each of the mounting elements is spaced from a corresponding portion on another mounting element a distance that is different than the first inside dimension.

5. The assembly of claim 4, including a vehicle component snappingly engaging the mounting elements.

6. The assembly of claim 4, wherein the mounting elements comprise hook-shaped catches.

7. The assembly of claim 4, wherein the mounting elements comprise projections molded as part of the shell adjacent the open end of the recess.

8. The assembly of claim 1, wherein the shell comprises a molded plastic foam.

9. The assembly of claim 1, including a rigid roof skin secured to the outer surface of the shell.

10. The assembly of claim 9, wherein the roof skin comprises metal.

11. The assembly of claim 9, wherein the roof skin comprises plastic.

12. The assembly of claim 1, wherein the side edges of the shell include a first portion that is adapted to be supported on top of a corresponding portion of the vehicle frame and a second portion extending away from the first portion toward the inner surface that is adapted to be separately secured to the vehicle frame.

13. The assembly of claim 1, including a decorative fabric secured to the inner surface of the shell.

14. A vehicle roof module assembly that is manufactured separately from another portion of the vehicle body, comprising:

a shell having an inner surface that is adapted to face toward an interior of a vehicle and an outer surface that provides a roof surface for the vehicle, the shell having at least two side edges and a central portion extending between the side edges, the central portion including at least one recess in the shell with an opening facing in the same direction as the inner surface; and a vehicle component supported by the shell and at least partially received into the recess.

15. The assembly of claim 14, wherein the vehicle component is one of a light, a speaker, a switch, or a ventilation grill.

16. The assembly of claim 14, wherein the shell comprises a molded plastic foam.

17. The assembly of claim 14, including a rigid roof skin secured to the outer surface of the shell.

18. The assembly of claim 14, wherein the recess includes at least one side wall extending from the inner surface toward an interior of the recess, the side wall establishing a first inside dimension of the recess, including mounting elements formed on the side wall near an open end of the recess, the mounting elements protruding from the side wall such that at least a portion of each of the mounting elements is spaced from a corresponding portion on another mounting element a distance that is different than the first inside dimension.

* * * * *